(12) United States Patent
Sakakibara

(10) Patent No.: US 10,850,579 B2
(45) Date of Patent: Dec. 1, 2020

(54) PNEUMATIC TIRE AND STRUCTURE FOR SECURING ELECTRONIC PART TO TIRE

(71) Applicant: TOYO TIRE & RUBBER CO., LTD., Itami (JP)

(72) Inventor: Kazuhiro Sakakibara, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 43 days.

(21) Appl. No.: 16/196,420

(22) Filed: Nov. 20, 2018

(65) Prior Publication Data

US 2019/0176547 A1 Jun. 13, 2019

(30) Foreign Application Priority Data

Dec. 8, 2017 (JP) .................................. 2017-235860

(51) Int. Cl.
*B60C 23/04* (2006.01)
*B29D 30/00* (2006.01)

(52) U.S. Cl.
CPC .. *B60C 23/0493* (2013.01); *B29D 2030/0072* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002;
B60C 23/0494; B60C 2019/004; B60C 23/0493; B60C 19/00; B60C 23/04; B60C 23/0498; B60C 23/064;
(Continued)

(56) References Cited

U.S. PATENT DOCUMENTS 7,275,427 B1 * 10/2007 Martin ................ B60C 23/0493
73/146
9,884,462 B2 * 2/2018 Hotaling ............. B60C 23/0493
(Continued)

FOREIGN PATENT DOCUMENTS

CN 104044412 A 9/2014
JP 2007-099052 A 4/2007
(Continued)

OTHER PUBLICATIONS

Office Action dated Jun. 23, 2020, issued in counterpart CN application No. 201811342670.6, with English translation. (15 pages).

*Primary Examiner* — Andre J Allen
(74) *Attorney, Agent, or Firm* — Westerman, Hattori, Daniels & Adrian, LLP

(57) ABSTRACT

A structure for securing an electronic part to a tire, has a sheet for securing the electronic part which is arranged between the sheet and a tire inner surface; and cushioning material which is arranged about a periphery of the electronic part and which adheres to the sheet and the tire inner surface. The cushioning material is not arranged on the tire inner surface where the electronic part is present but surrounds the electronic part completely or surrounds the electronic part except for at least one gap smaller than the electronic part.

8 Claims, 4 Drawing Sheets

(58) Field of Classification Search
CPC ............ B60C 23/0488; B60C 23/0496; B60C 23/0408; B60C 23/041; B60C 23/0411; B60C 23/20; B60C 23/0486; B60C 23/06; B60C 11/243; B60C 11/246; B60C 23/061; B60C 99/00; B60C 11/0083; B60C 13/003; B60C 2009/2038; B60C 23/00; B60C 23/003; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0457; B60C 23/0462; B60C 23/0467; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28; G01L 17/00; G01L 17/005; G01L 19/0645; G01L 19/147; G01L 1/16; G01L 1/18; G01L 7/187; G01L 9/0052; G01L 9/008
USPC .................................................. 73/146–146.8
See application file for complete search history.

(56) References Cited

U.S. PATENT DOCUMENTS

| | | | | |
|---|---|---|---|---|
| 10,434,828 | B2* | 10/2019 | Wilson | B60C 23/0493 |
| 2005/0076982 | A1* | 4/2005 | Metcalf | B60C 23/0493 152/152.1 |
| 2005/0126668 | A1* | 6/2005 | Fornerod | B60C 23/0493 152/152.1 |
| 2006/0220816 | A1* | 10/2006 | Scheungraber | B60C 23/0493 340/447 |
| 2009/0173422 | A1* | 7/2009 | Utsumi | B60C 23/0493 152/510 |
| 2009/0266153 | A1* | 10/2009 | Hironaka | B60C 23/0493 73/146.5 |
| 2010/0122757 | A1* | 5/2010 | Lionetti | B60C 23/041 152/152.1 |
| 2010/0230024 | A1 | 9/2010 | Borot et al. | |
| 2011/0271520 | A1* | 11/2011 | Wilson | B60C 23/0433 29/601 |
| 2013/0081457 | A1* | 4/2013 | Wilson | B60C 23/0493 73/146 |
| 2014/0261944 | A1 | 9/2014 | Papakonstantopoulos et al. | |
| 2014/0367026 | A1 | 12/2014 | Battocchio et al. | |
| 2017/0059435 | A1* | 3/2017 | Marques | B60C 23/0483 |
| 2017/0349010 | A1* | 12/2017 | Wilson | B60C 23/0493 |
| 2018/0361804 | A1* | 12/2018 | Wei | B29D 30/0061 |
| 2019/0329609 | A1* | 10/2019 | Puppi | B29D 30/0061 |
| 2019/0381841 | A1* | 12/2019 | Barjon | B60C 23/0493 |

FOREIGN PATENT DOCUMENTS

| | | | |
|---|---|---|---|
| JP | 2012-240465 A | 12/2012 | |
| WO | 2009/013269 A1 | 1/2009 | |
| WO | 2013/050711 A1 | 4/2013 | |
| WO | WO-2016109030 A1 * | 7/2016 | ............... B60C 5/04 |

* cited by examiner

PNEUMATIC TIRE AND STRUCTURE FOR SECURING ELECTRONIC PART TO TIRE

BACKGROUND OF THE INVENTION

Field of the Invention

The present disclosure relates to a pneumatic tire and to a structure for securing an electronic part to a tire at which an electronic part is properly attached to an inner surface of a tread region.

Description of the Related Art

Studies have been performed in recent years regarding the attachment of objects having various functions to inner surfaces of pneumatic tires.

Japanese Patent Application Publication Kokai No. 2012-240465, for example, discloses art whereby one of a pair of mechanical fasteners comprising hook(s) or snap(s) is embedded in the inner surface of a tire so as to permit an object such as an electronic part comprising a sensor to be secured to the tire inner surface by way of the fastener.

International Patent Application Publication No. 2009/13269 discloses art whereby one side of a surface fastener made up of a hook side and a loop side is embedded in the inner surface of a tire so as to permit an electronic part to be secured to the tire inner surface by way of the surface fastener.

International Patent Application Publication No. 2013/50711 discloses art whereby an electronic part is secured to the inner surface of a tire by means of an adhering element and a separating element.

However, in situations such as at Japanese Patent Application Publication Kokai No. 2012-240465 and International Patent Application Publication No. 2009/13269 in which the structure is such that a foreign object is embedded in the tire inner surface, while this is advantageous in that, as there is little chance that that the foreign object will become detached from the tire, it is possible to ensure that the strength with which this is secured thereto will be adequate, there is a risk that cracking will occur, this being initiated from the site of the foreign object, as a result of which the tire stands to suffer a loss in endurance.

And with a constitution such as that at International Patent Application Publication No. 2013/50711 in which an electronic part and the tire inner surface are separated by means of a separating element while being secured by means of an adhering element, this is disadvantageous in that it does not permit information pertaining to the tire itself to be sensed.

SUMMARY OF INVENTION

The present disclosure was conceived in view of such problems, it being an object thereof to provide a structure for securing an electronic part to a tire that will make it possible for the electronic part to be properly secured to an inner surface of the tire without impairing the durability thereof, and to a pneumatic tire having such a structure.

To solve the foregoing problem, the present disclosure employs means as described below.

In other words, according to the present disclosure, there is provided a structure for securing an electronic part to a tire, having:

a sheet for securing the electronic part which is arranged between the sheet and a tire inner surface; and cushioning material which is arranged about a periphery of the electronic part and which adheres to the sheet and the tire inner surface;

wherein the cushioning material is not arranged on the tire inner surface where the electronic part is present but surrounds the electronic part completely or surrounds the electronic part except for at least one gap smaller than the electronic part.

Because cushioning material is not arranged on tire inner surface where electronic part is present, such a constitution will make it possible to secure electronic part so that it comes in contact with tire inner surface.

Because sheet for securing electronic part is made to adhere to tire inner surface by way of cushioning material, cushioning material is able to mitigate any deformation or bending of tire inner surface, as a result of which detachment of sheet is prevented, permitting improvement in the strength with which this is secured thereto.

Because cushioning material surrounds electronic part completely or surrounds electronic part except for gap(s) smaller than electronic part, sheet and cushioning material will retain electronic part despite the fact that electronic part is not secured directly to tire inner surface, and so it is possible for electronic part to be properly secured thereto. And yet, because sheet need only be made to adhere to tire inner surface by way of cushioning material, it is possible to improve endurance as compared with constitutions in which foreign object(s) are embedded in tire inner surface.

Where cushioning material surrounds electronic part except for gap(s) smaller than electronic part, this is useful because it makes it possible for wiring to be routed by way of such gap(s).

It will therefore be possible to cause an electronic part to be properly secured to an inner surface of a tire without impairing the durability thereof.

DETAILED DESCRIPTION OF THE PREFERRED EMBODIMENTS

Pneumatic Tire

Figure 1:
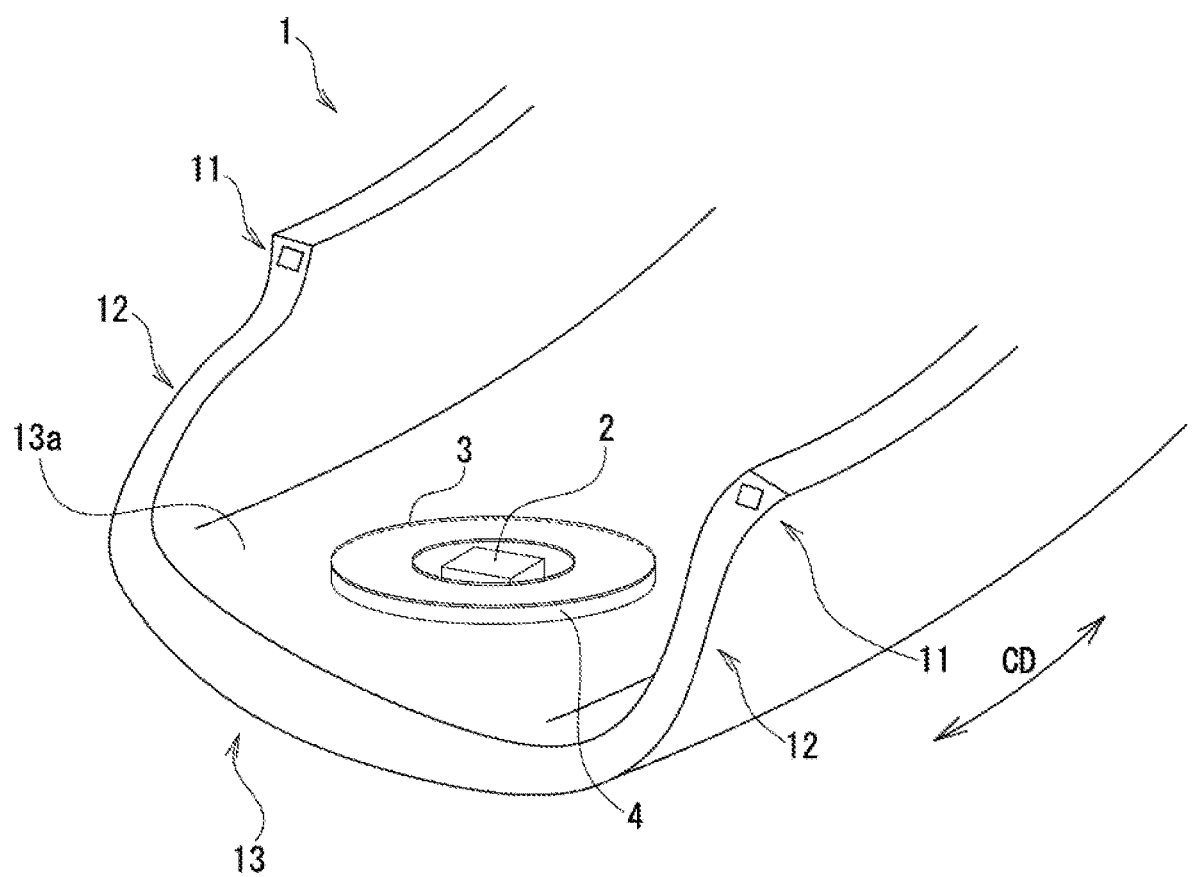
FIG. 1 Perspective view showing an example of a pneumatic tire in accordance with the present disclosure.

Below, embodiments of the present invention are described with reference to the drawings. FIG. 1 is a perspective view showing an example of a pneumatic tire.

As shown in FIG. 1, pneumatic tire 1 is provided with a pair of annular bead regions 11, sidewall regions 12 which extend toward the exterior in the tire radial direction from those respective bead regions 11, and a tread region 13 which is contiguous with the respective outer ends in the tire radial direction of those sidewall regions 12.

Figure 2:
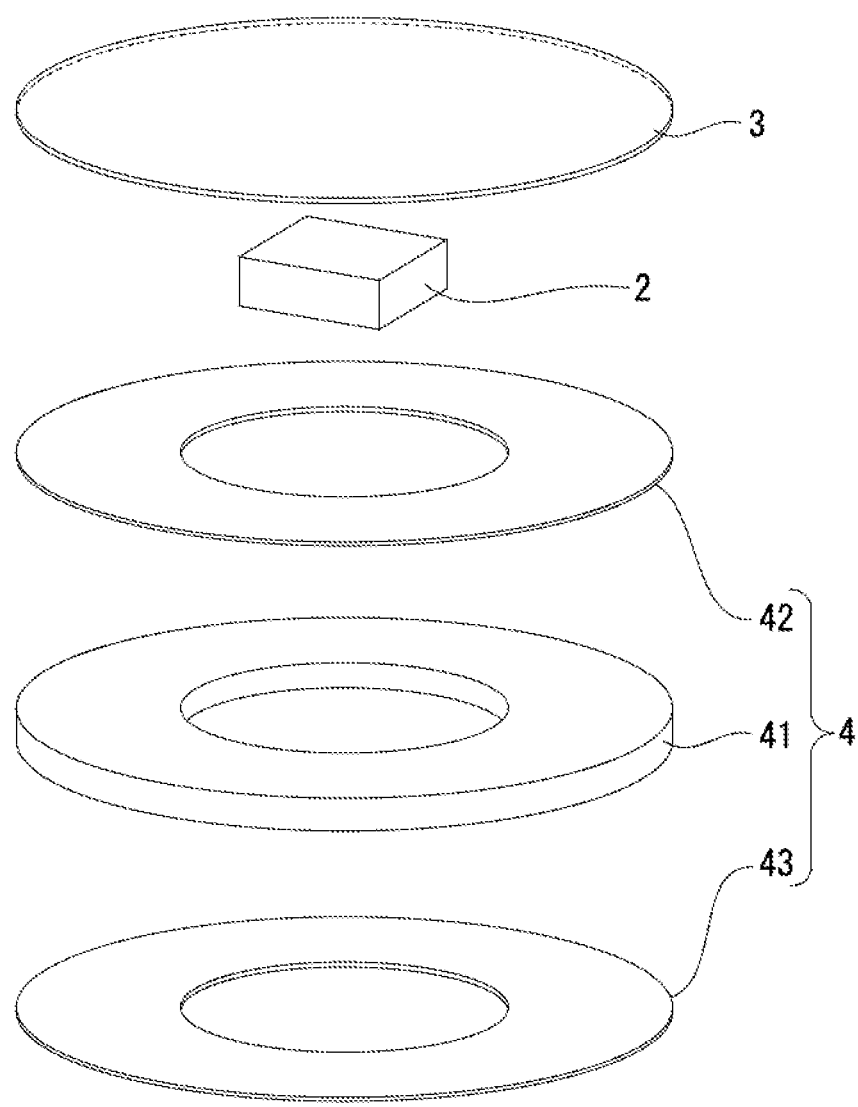
FIG. 2 Exploded view of an electronic part, a sheet, and cushioning material
Figure 3:
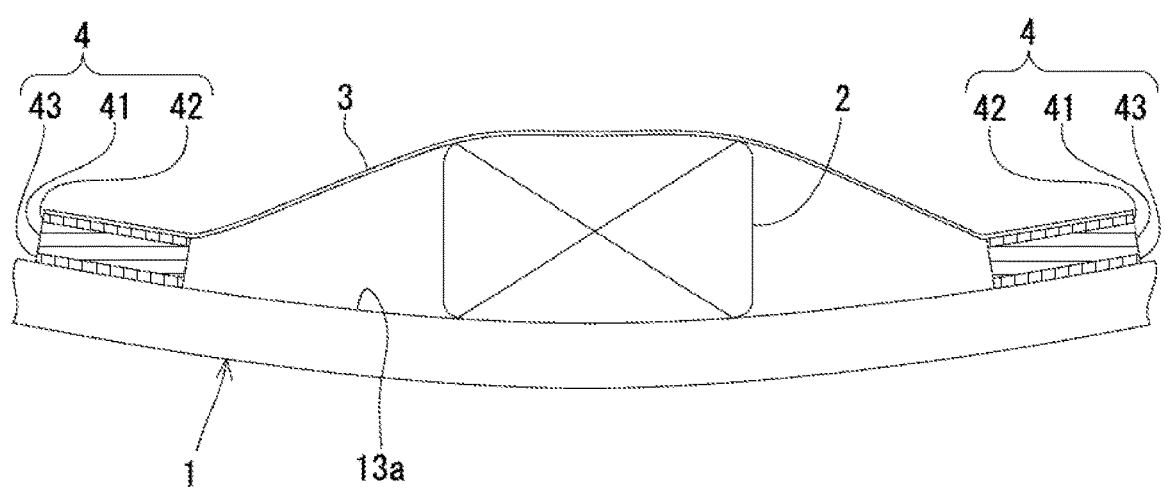
FIG. 3 Schematic sectional view of an electronic part, a sheet, and cushioning material FIG. 4A Plan view showing positional relationship among cushioning material, an electronic part, and a slit at a sheet FIG. 4B Plan view showing positional relationship between cushioning material and an electronic part in a variation FIG. 4C Plan view showing positional relationship between cushioning material and an electronic part in a variation
Figure 4A:
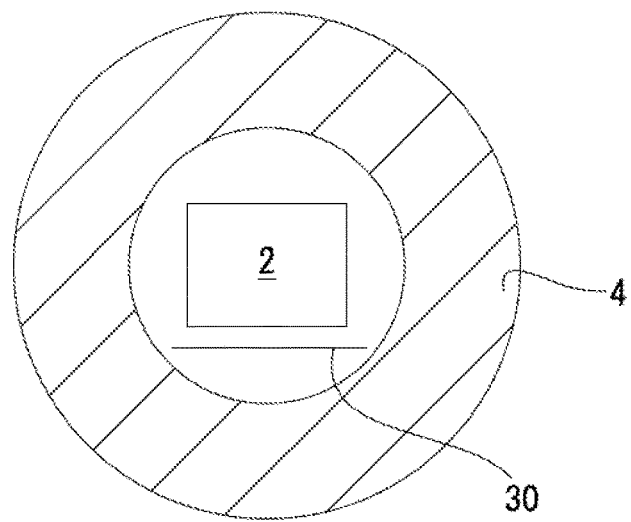

Pneumatic tire 1 has a structure for securing an electronic part to a tire at which electronic part 2 is secured to an inner surface 13a of a tread region. The securing structure has a sheet 3 for securing an electronic part 2 which is arranged between tread region inner surface 13a constituting the tire inner surface and electronic part 2, and cushioning material 4 which is arranged about the periphery of electronic part 2 and which adheres to tire inner surface 13a and sheet 3. FIG. 2 is an exploded view of electronic part 2, sheet 3, and cushioning material 4. FIG. 3 is a schematic sectional view of electronic part 2, sheet 3, and cushioning material 4. FIG. 4A is a plan view showing the positional relationship among cushioning material 4, electronic part 2, and a slit at sheet 3. As electronic part 2, sensors (acceleration sensors, temperature sensors, strain gauges, sound pressure sensors, internal pressure sensors, etc.), communication modules, and batteries may be cited as examples.

Sheet 3 is formed from resin in the form of a plate or film. As resin, PET, PU, TPU, PVC, PC, PE, PEN, and other general-purpose resins may be cited as examples. As shown in FIG. 4A, linear slit 30 is formed at sheet 3, the constitution being such as to allow insertion and removal of electronic part 2 by way of slit 30. Slit 30 need not be provided. So long as it is linear, slit 30 may be in the shape of a straight line, curve, zigzag, or any combination theramong. It is preferred that thickness of sheet 3 be 0.1 mm to 0.3 mm.

As shown in FIG. 1, FIG. 2, FIG. 3, and FIG. 4A, cushioning material 4 has cushioning material main body 41 which is stretchable, and adhesive layers 42, 43 on either side of cushioning material main body 41. Because this makes it possible for cushioning material main body 41 at cushioning material 4 to deform such that it is able to conform to the shape of the curved surface of tire inner surface 13a as well as to the deformation thereof when the tire makes contact with the ground, this makes it possible for sheet 3 and electronic part 2 to be secured in stable fashion to tread region inner surface 13a. In particular, because it is often the case that an irregular surface is formed at tire inner surface 13a due to presence of the bladder, and because cushioning material main body 41 is able to accommodate such irregularly shaped surfaces, this makes it possible to improve the strength with which this is secured thereto as compared with the situation that would exist if sheet 3 were made to adhere directly on tire inner surface 13a. As cushioning material main body 41, urethane foam and so forth may be cited as examples. It is preferred that thickness of cushioning material main body 41 be 1.5 mm to 3.0 mm. It is preferred that the specific gravity thereof be 0.25 to 0.30.

Figure 4B:
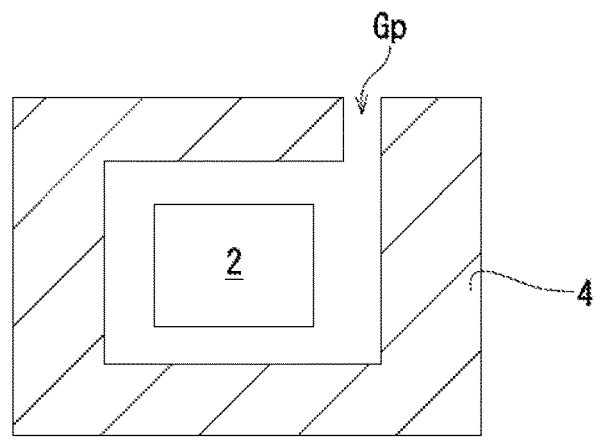

Cushioning material 4 is not arranged on tire inner surface 13a where electronic part 2 is present but completely surrounds electronic part 2. In accordance with the present embodiment, as seen in plan view, cushioning material 4 appears annular with a hollow center (i.e., donut-like in shape), cushioning material 4 being an integral and contiguous body. Because cushioning material 4 is thus an integral and contiguous body, this facilitates attachment thereof to tire inner surface 13a. Of course, cushioning material 4 is not limited to the annular shape shown in FIG. 4A, various modifications with respect to the shape thereof being possible. For example, as indicated at FIG. 4B, it is possible for this to be such that cushioning material 4 is not arranged on tire inner surface 13a where electronic part 2 is present, but is arranged so as to, except for gap Gp which is smaller than electronic part 2, surround electronic part 2. Cushioning material 4 in FIG. 4B is an integral and contiguous body.

Figure 4C:
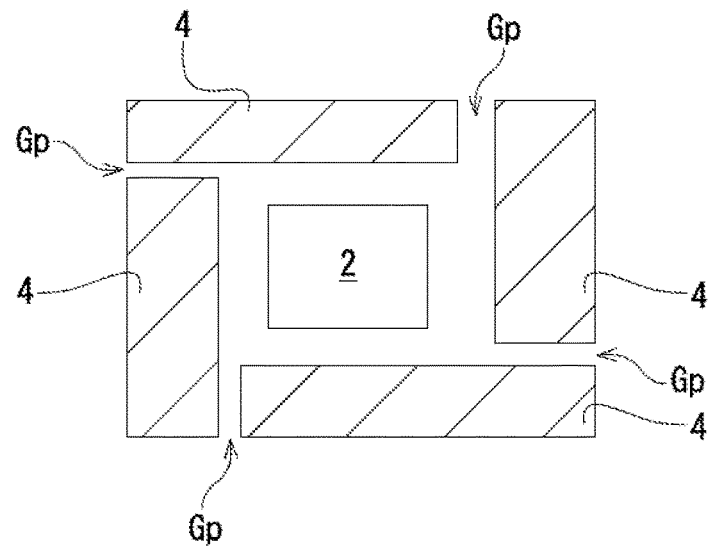

Because cushioning material 4 is thus arranged so as to, except for gap Gp which is smaller than electronic part 2, surround electronic part 2, this is useful because it makes it possible for wiring to be routed by way of this gap Gp. Moreover, as indicated at FIG. 4C, it is possible to arrange a plurality of pieces of cushioning material 4 that, except for gaps Gp therebetween which are each smaller than electronic part 2, collectively surround electronic part 2. In the situation shown in FIG. 4C, because the pieces of cushioning material 4 are neither integral nor contiguous, each piece of cushioning material 4 must be made to adhere thereto individually; however, this permits increase in the degrees of freedom with respect to how they are arranged.

Although in accordance the present embodiment electronic part 2 is not secured to tire inner surface 13a by adhesive tape, it is possible for only a portion of electronic part 2 to be secured to tire inner surface 13a by adhesive tape. This is because since electronic part 2 is a sensor, and so there will be no objection so long as the detector is not covered with adhesive tape.

As described above, a structure for securing an electronic part 2 to a tire 1 in accordance with the present embodiment has a sheet 3 for securing an electronic part 2 which is arranged between the sheet 3 and a tire inner surface 13a, and cushioning material 4 which is arranged about the periphery of electronic part 2 and which adheres to tire inner surface 13a and sheet 3. Cushioning material 4 is not arranged on tire inner surface 13a where electronic part 2 is present but surrounds electronic part 2 completely or surrounds electronic part 2 except for gap(s) Gp smaller than electronic part 2.

Because cushioning material 4 is not arranged on tire inner surface 13a where electronic part 2 is present, such a constitution will make it possible to secure electronic part 2 so that it comes in contact with tire inner surface 13a.

Because sheet 3 for securing electronic part 2 is made to adhere to tire inner surface 13a by way of cushioning material 4, cushioning material 4 is able to mitigate any deformation or bending of tire inner surface 13a, as a result of which detachment of sheet 3 is prevented, permitting improvement in the strength with which this is secured thereto.

Because cushioning material 4 surrounds electronic part 2 completely or surrounds electronic part 2 except for gap(s) Gp smaller than electronic part 2, sheet 3 and cushioning material 4 will retain electronic part 2 despite the fact that electronic part 2 is not secured directly to tire inner surface 13a, and so it is possible for electronic part 2 to be properly secured thereto. And yet, because sheet 3 need only be made to adhere to tire inner surface 13a by way of cushioning material 4, it is possible to improve endurance as compared with constitutions in which foreign object(s) are embedded in tire inner surface 13a.

Where cushioning material 4 surrounds electronic part 2 except for gap(s) Gp smaller than electronic part 2, this is useful because it makes it possible for wiring to be routed by way of such gap(s) Gp.

It will therefore be possible to cause an electronic part to be properly secured to an inner surface of a tire without impairing the durability thereof.

In accordance with the present embodiment, cushioning material 4 is an integral and contiguous body.

Such a constitution will facilitate attachment to tire inner surface 13a as compared with the situation that exists when cushioning material 4 is separated into a plurality of pieces.

In accordance with the present embodiment, cushioning material 4 is formed in such fashion that it appears annular as seen in plan view.

In accordance with the present embodiment, sheet 3 has linear slit 30, the constitution being such as to allow insertion and removal of electronic part 2 by way of slit 30.

Such a constitution will facilitate replacement of electronic part 2.

The pneumatic tire of the present embodiment has a structure for securing an electronic part 2 to the tire. This a preferred exemplary application of the present disclosure.

While embodiments in accordance with the present disclosure have been described above with reference to the drawings, it should be understood that the specific constitution thereof is not limited to these embodiments. The scope of the present disclosure is as indicated by the claims and not merely as described at the foregoing embodiments, and moreover includes all variations within the scope of or equivalent in meaning to that which is recited in the claims.

Structure employed at any of the foregoing embodiment(s) may be employed as desired at any other embodiment(s). The specific constitution of the various components is not limited only to the foregoing embodiment(s) but admits of any number of variations without departing from the gist of the present disclosure.

The invention claimed is:

1. A structure, comprising:
   a sheet which directly contacts an electronic part to secure to a tire the electronic part between the sheet and a tire inner surface of the tire; and
   cushioning material which is arranged about a periphery of the electronic part and which adheres to the sheet and the tire inner surface;
   wherein the cushioning material is arranged on neither a first side nor a second side of the electronic part, and does not contact any portion of the electronic part on the second side of the electronic part where the first side is a side of the electronic part facing the tire inner surface, and the second side is a side of the electronic part which is opposite to the first side.

2. The structure according to claim 1 wherein the cushioning material is an integral and contiguous body.

3. The structure according to claim 1 wherein the cushioning material is formed in such fashion that it appears annular as seen in plan view.

4. The structure according to claim 1 wherein the sheet has a linear slit and is constituted such as to allow insertion and removal of the electronic part by way of the slit.

5. The structure according to claim 1 wherein the sheet directly contacts the second side of the electronic part.

6. A pneumatic tire having a structure, the structure comprising:
   a sheet which directly contacts an electronic part to secure to a tire the electronic part between the sheet and a tire inner surface of the tire; and
   cushioning material which is arranged about a periphery of the electronic part and which adheres to the sheet and the tire inner surface,
   wherein the cushioning material is arranged on neither a first side nor a second side of the electronic part, and does not contact any portion of the electronic part on the second side of the electronic part where the first side is a side of the electronic part facing the tire inner surface, and the second side is a side of the electronic part which is opposite to the first side.

7. The pneumatic tire according to claim 6 wherein the electronic part directly contacts the tire inner surface.

8. The pneumatic tire according to claim 6 wherein the sheet directly contacts the electronic part to secure the electronic part to the tire inner surface of a tire tread of the tire, and the first side faces a radially external direction of the tire.

* * * * *